US010997116B2

(12) United States Patent
Reinhardt et al.

(10) Patent No.: US 10,997,116 B2
(45) Date of Patent: May 4, 2021

(54) TENSOR-BASED HARDWARE ACCELERATOR INCLUDING A SCALAR-PROCESSING UNIT

(71) Applicant: Microsoft Technology Licensing, LLC, Redmond, WA (US)

(72) Inventors: Steven Karl Reinhardt, Vancouver, WA (US); Joseph Anthony Mayer, II, Seattle, WA (US); Dan Zhang, Foster City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/533,237

(22) Filed: Aug. 6, 2019

(65) Prior Publication Data

US 2021/0042260 A1 Feb. 11, 2021

(51) Int. Cl.
*G06F 15/80* (2006.01)
*G06N 3/08* (2006.01)
*G06F 9/30* (2018.01)

(52) U.S. Cl.
CPC ........... *G06F 15/8061* (2013.01); *G06N 3/08* (2013.01); *G06F 9/30101* (2013.01)

(58) Field of Classification Search
CPC .. G06F 9/3877; G06F 9/30025; G06F 9/3867; G06F 17/16; G06F 15/8053; G06F 15/8092; G06F 15/8061; G06F 15/80–825; G06T 1/20; G06N 3/04; G06N 3/02–126
See application file for complete search history.

(56) References Cited

U.S. PATENT DOCUMENTS 5,625,834 A * 4/1997 Nishikawa .......... G06F 9/30036
712/9
7,146,486 B1 * 12/2006 Prokopenko .......... G06F 9/3887
712/22

(Continued)

OTHER PUBLICATIONS

Valeriu Codreanu, Lucian Petrica and Radu Hobincu, "Increasing Vector Processor Pipeline Efficiency with a Thread-interleaved Controller", Nov. 28, IEEE, pp. 1-4 (Year: 2011).*

(Continued)

*Primary Examiner* — Aimee Li
*Assistant Examiner* — Courtney P Carmichael-Moody

(57) ABSTRACT

A computing system is described herein that expedites deep neural network (DNN) operations or other processing operations using a hardware accelerator. The hardware accelerator, in turn, includes a tensor-processing engine that works in conjunction with a scalar-processing unit (SPU). The tensor-processing engine handles various kinds of tensor-based operations required by the DNN, such as multiplying vectors by matrices, combining vectors with other vectors, transforming individual vectors, etc. The SPU performs scalar-based operations, such as forming the reciprocal of a scalar, generating the square root of a scalar, etc. According to one illustrative implementation, the computing system uses the same vector-based programmatic interface to interact with both the tensor-processing engine and the SPU.

20 Claims, 8 Drawing Sheets

(56) References Cited

U.S. PATENT DOCUMENTS

| | | | |
|---|---|---|---|
| 10,331,445 B2 | 6/2019 | Fowers et al. | |
| 2003/0154361 A1* | 8/2003 | Barlow | G06F 9/30036 712/214 |
| 2004/0019747 A1 | 1/2004 | Barlow et al. | |
| 2011/0161586 A1* | 6/2011 | Potkonjak | G06F 12/084 711/122 |
| 2015/0067009 A1 | 3/2015 | Strauss et al. | |
| 2015/0067273 A1 | 3/2015 | Strauss et al. | |
| 2016/0125263 A1 | 5/2016 | Sankaranarayanan et al. | |
| 2017/0316312 A1* | 11/2017 | Goyal | G06F 7/48 |
| 2018/0285316 A1* | 10/2018 | Thorson | G06F 9/3877 |
| 2018/0314941 A1* | 11/2018 | Lie | G06N 3/10 |
| 2018/0336456 A1* | 11/2018 | Norrie | G06F 9/3887 |
| 2018/0341483 A1 | 11/2018 | Fowers et al. | |
| 2018/0341484 A1 | 11/2018 | Fowers et al. | |
| 2018/0341622 A1 | 11/2018 | Chung et al. | |
| 2019/0065192 A1* | 2/2019 | Tao | G06F 9/30105 |
| 2019/0065436 A1* | 2/2019 | Zhang | G06F 17/16 |
| 2019/0095175 A1 | 3/2019 | Yamanaka et al. | |
| 2019/0354508 A1* | 11/2019 | Mahurin | G06F 9/30036 |

OTHER PUBLICATIONS

Chung, et al., "Serving DNNs in Real Time at Datacenter Scale with Project Brainwave," in IEEE Micro, vol. 38, No. 2, Mar./Apr. 2018, pp. 8-20.

Fowers, et al., "A Configurable Cloud-Scale DNN Processor for Real-Time AI," in 2018 ACM/IEEE 45th Annual International Symposium on Computer Architecture (ISCA), Jun. 2018, 14 pages.

"Softmax function," available at <<https://en.wikipedia.org/wiki/Softmax_function>>, Wikipedia article, accessed on Jul. 16, 2019, 8 pages.

PCT Search Report and Written Opinion for PCT Application No. PCT/US2020/036873, dated Sep. 23, 2020, 16 pages.

Foley, Denis, "NVLink, Pascal and Stacked Memory: Feeding the Appetite for Big Data," available at https://developer.nvidia.com/blog/nvlink-pascal-stacked-memory-feeding-appetite-big-data/, retrieved on Sep. 2, 2020, Nvidia Developer Blog, dated Mar. 25, 2014, 4 pages.

Wang, et al., "High-Throughput CNN Inference on Embedded ARM big.LITTLE Multi-Core Processors," arXiv:1903.05898v1 [cs.LG], Mar. 14, 2019, 14 pages.

* cited by examiner

OVERVIEW OF OPERATION OF THE COMPUTING SYSTEM
702

IN THE COURSE OF EXECUTING A SET OF INSTRUCTIONS THAT CARRY OUT OPERATIONS ASSOCIATED WITH A NEURAL NETWORK OR OTHER ANALYSIS TASK, USE A TENSOR- PROCESSING ENGINE TO CONVERT AT LEAST ONE INSTANCE OF INPUT TENSOR INFORMATION TO AT LEAST ONE INSTANCE OF OUTPUT TENSOR INFORMATION.
704

IN THE COURSE OF EXECUTING THE SET OF INSTRUCTIONS, USE A SCALAR-PROCESSING UNIT TO:
    706-1: PROVIDE ONE OR MORE SCALARS BASED ON AN INPUT VECTOR RECEIVED FROM THE TENSOR-PROCESSING ENGINE;
    706-2: STORE THE ONE OR MORE SCALARS IN A SCALAR REGISTER FILE;
    706-3: RETRIEVE AT LEAST ONE INPUT SCALAR FROM THE SCALAR REGISTER FILE;
    706-4: PERFORM A SCALAR-PROCESSING FUNCTION TO GENERATE AT LEAST ONE OUTPUT SCALAR BASED ON THE AT LEAST ONE INPUT SCALAR;
    706-5 STORE THE AT LEAST ONE OUTPUT SCALAR IN THE SCALAR REGISTER FILE; AND
    706-6: PROVIDE AN OUTPUT VECTOR BASED ON ONE OR MORE SCALARS STORED IN THE SCALAR REGISTER FILE.
706

FIG. 7

TENSOR-BASED HARDWARE ACCELERATOR INCLUDING A SCALAR-PROCESSING UNIT

BACKGROUND

Many deep neural networks (DNNs) operate in environments that demand low-latency responses. These types of environments include search engines, real-time video analysis engines, interactive speech recognition engines, sensor analysis engines, and so on. For example, a user who interacts with a search engine will expect a near real-time response to his or her search request.

SUMMARY

A computing system is described herein that expedites deep neural network (DNN) operations or other processing operations using a hardware accelerator. The hardware accelerator, in turn, includes a tensor-processing engine that works in conjunction with a scalar-processing unit (SPU). The tensor-processing engine handles various kinds of tensor-based operations required by the DNN (or other analysis task). These tensor-based operations constitute the bulk of the work performed by the hardware accelerator, and encompass multiplying vectors by matrices, combining vectors with other vectors, transforming individual vectors, etc. The SPU performs scalar-based operations, such as forming the reciprocal of a scalar, generating the square root of a scalar, etc.

According to one illustrative implementation, the computing system uses the same vector-based programmatic interface to interact with both the tensor-processing engine and the SPU. To operate in this manner, the SPU includes a vector-to-scalar interface that converts an input vector received from the tensor-processing engine into one or more scalars. The SPU stores the input scalar(s) in a global scalar register file. The SPU also includes one or more scalar operation hardware components (HCs). Each scalar operation HC reads at least one input scalar from the scalar register file, performs some scalar operation on the input scalar(s) to generate at least one output scalar, and then writes the output scalar(s) back into the scalar register file. The SPU also includes a scalar-to-vector interface that converts one or more scalars stored in the scalar register file into an output vector.

According to one implementation, the vector-to-scalar interface can produce a scalar by generating the sum, maximum, or minimum of the element values in the input vector. The scalar-to-vector interface can replicate a scalar retrieved from the scalar register file to generate the output vector. Alternatively, or in addition, the scalar register file includes a write port for receiving an input vector in vector form, and a read port for providing an output vector in vector form.

According to one technical advantage, the computing system seamlessly integrates scalar operations into a processing pipeline otherwise devoted to tensor-based operations. This characteristic increases the efficiency of the computing system. It also facilitates the task of writing computer programs that include both tensor-based and scalar operations.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 7 is a flowchart that shows one illustrative manner of operation of computing system of FIGS. 1 and 2.

Figure 1:
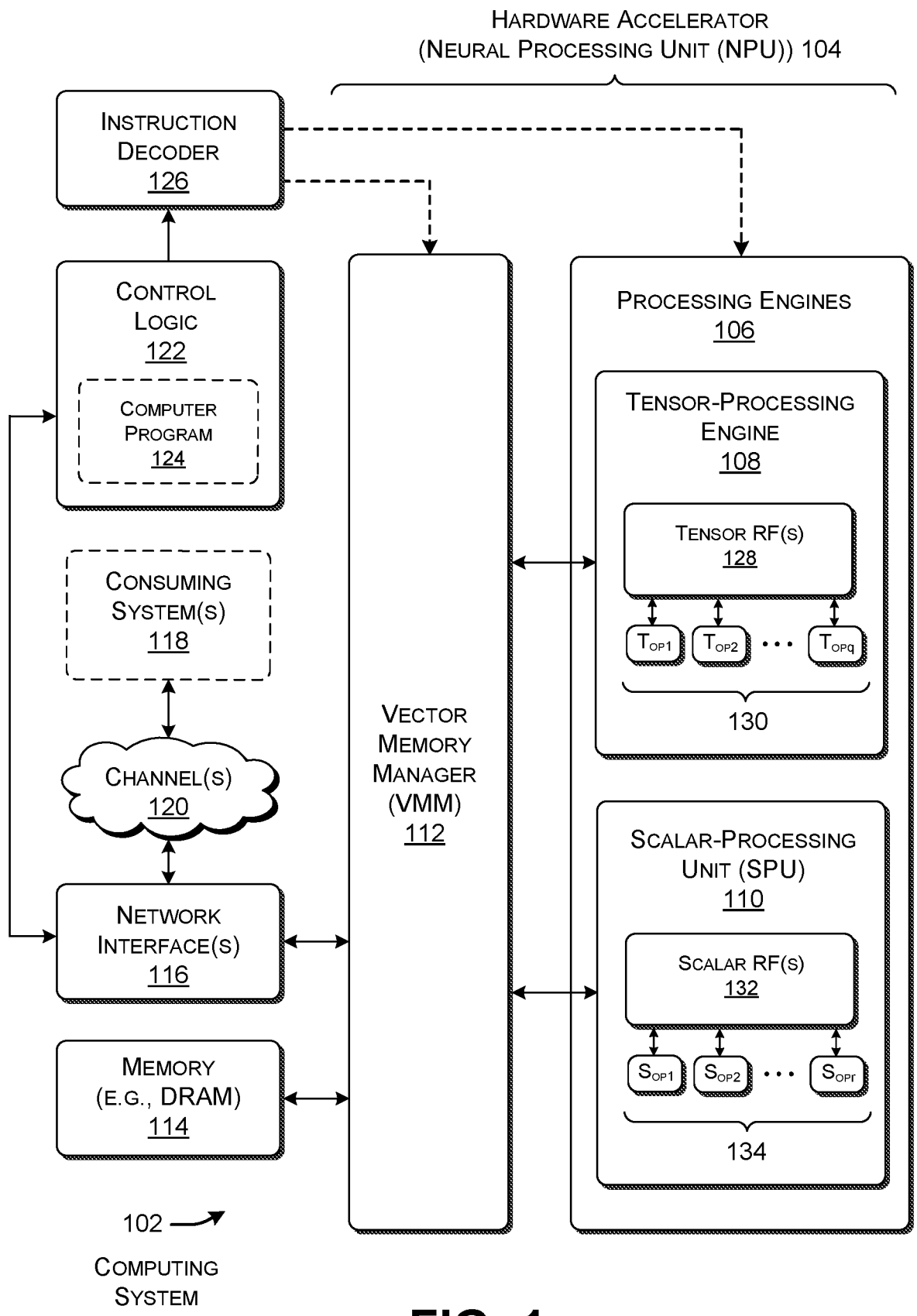
FIG. 1 shows an overview of an illustrative computing system that includes a hardware accelerator. The hardware accelerator, in turn, includes a tensor-processing engine and a scalar-processing unit.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system having a hardware accelerator that expedites operations associated with a deep neural network (DNN) or other type of analysis logic. Section B sets forth an illustrative method that explains the operation of the computing system of Section A. And Section C describes illustrative computing hardware that can be used to implement any aspect of the features described in Sections A and B.

As a preliminary matter, some of the figures show the structural features of the computing system. The illustrated separation of various parts in these figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks).

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing System

FIG. 1 shows an illustrative computing system 102 that includes a hardware accelerator 104. The hardware accelerator 104, in turn, includes two types of processing engines 106: a tensor-processing engine 108 and a scalar-processing unit (SPU) 110. The tensor-processing engine 108 performs operations in the form of tensors. The SPU 110 performs operations in the form of scalars. Typically, most of the work performed by the processing engines is allocated to the tensor-processing engine 108. In these contexts, the SPU 110 can be regarded as an add-on processor that handles residual non-tensor-related work within a tensor-based data flow.

As the term is used herein, a tensor includes an array of two or more elements. Tensors include at least matrices (having at least two dimensions) and vectors. A scalar refers to a single element having a value. As used herein, the terms "scalar" and "scalar value" are considered synonymous.

In one implementation, the hardware accelerator 104 is implemented as a dedicated hardware component. For example, the hardware accelerator 104 can include a fabric of field-programmable gate array (FPGA) units. Alternatively, or in addition, the hardware accelerator 104 can be implemented using one or more application specific integrated circuits (ASICs). Alternatively, or in addition, the hardware accelerator 104 can be implemented using a general-purpose graphics processing unit (GPGPU), etc. The above-described examples are set forth in the spirit of illustration, not limitation; the hardware accelerator 104 can be implemented by yet other types of dedicated hardware units.

In some implementations, the hardware accelerator 104 represents a "soft" processor that can be reprogrammed after its manufacture to perform different respective operations. The hardware accelerator 104 can achieve this result using programmable gate array devices, such as FPGAs. In other implementations, the hardware accelerator 104 is hardwired to perform a fixed set of operations. The hardware accelerator 104 can achieve this result using, for example, hardwired gate arrays, ASICs, etc.

In some implementations, the hardware accelerator 104 represents a neural processing unit (NPU) that carries out operations associated with any type(s) of deep neural network (DNN), or other type(s) of neural network (that is, other than DNNs). Exemplary types of DNNs include convolutional neural networks (CNN), recurrent neural networks (RNNs), etc. An RNN can include long short-term memory (LSTM) units, gated recurrent units (GRUs), etc. More specifically, the computing system 102 uses the hardware accelerator 104 to expedite the application-phase operation of an already-trained DNN (where the term "application-phase" is meant to distinguish from the offline training of the DNN). In other implementations, the hardware accelerator 104 implements some other computation-intensive analysis task, not necessarily associated with a DNN. The computing system 102 can also use the hardware accelerator 104 to train a DNN or other type of neural network.

The hardware accelerator 104 also includes an optional vector memory manager (VMM) 112. Among other tasks, the VMM 112 manages the exchange of data between the processing engines 106 and various other components. For instance, the VMM 112 serves as a vector interface between the processing engines 106 and a memory (e.g., DRAM) 114. The VMM 112 also serves as an interface between the processing engines 106 and one or more network interfaces 116.

The network interface(s) 116 interact with one or more consuming systems 118 via one or more channels 120. To do so, the network interface(s) 116 maintain an input queue for receiving input data and commands from the consuming systems 118. The network interface(s) 116 forwards the input data to the processing engines 106 for processing. The network interface(s) 116 also maintain an output queue for receiving output data generated by processing engines 106. The network interface(s) forwards the output data to the consuming systems 118 via the channel(s) 120. The channel(s) 120 may include any of a local area network (such as a local area network provided by a data center), a wide area network (such as the Internet), any type of bus (such as a PCIe bus), etc.

The consuming systems 118 can provide any combination of services that interact with the processing engines 106 for any purpose(s). One kind of consuming system corresponds to a search engine that uses the processing engines 106 to perform semantic analysis on an input query using a CNN. Another type of consuming system corresponds to an interactive speech recognition engine that uses the processing engines 106 to analyze a user's input speech in real time, and so on. Any consuming system can also forward arguments or other commands that govern the type of processing operations performed by the processing engines 106.

Control logic 122 supplies the instructions that govern the operation of the hardware accelerator 104. It does so based on a computer program 124 written by a human programmer. In one case, the instructions describe the operations associated with each layer or recurrent unit of a neural network, or other type of analysis engine. In one implementation, the control logic 122 represents a computing device that includes a central processing unit (CPU). Alternatively, or in addition, the control logic 122 represents a part of one or more other components of the computing system 102. For example, the control logic 122 may represent a component within the processing engines 106 and/or the VMM 112, etc.

An instruction decoder 126 maps the instructions of the computer program 124 to more primitive control commands that control the operation of different respective parts of the hardware accelerator. For example, assume that the tensor-processing engine 108 includes plural tile engines (not shown) that work in parallel to compute the product of a vector with a matrix. Further assume that computer program includes an instruction that describes this computation from a high-level perspective. Here, the instruction decoder 126 maps the high-level instruction into plural primitive control commands, each of which controls a different tile engine. The instruction decoder 126 performs the mapping between high-level instructions and low-level commands based on prescribed rules and based on one or more setup parameters. For instance, one or more setup parameters may instruct the tensor-processing engine 108 to use a specified degree of parallelism in processing input requests.

As shown in high-level form in FIG. 1, the tensor-processing engine 108 includes one or more tensor register files 128 for storing tensor information (e.g., vectors, matrices, etc.). The tensor-processing engine 108 also includes one or more tensor operation hardware components (HCs) 130 for performing operations in tensor-based form. The SPU 110 includes one or more scalar register files 132 for storing scalar information. The SPU 110 also includes one or more scalar operation hardware components (HCs) 134 for performing operations in scalar-based form.

As will be set forth below in greater detail, the tensor-processing engine 108 and the SPU 110 use the same type of vector-based programmatic interface. This means that both the tensor-processing engine 108 and SPU 110 accept input data in the form of vectors, and supply output data in the form of vectors. But internally, the tensor-processing engine 108 performs operations on the input data fed to it in vector form, while the SPU 110 performs operations on the input data fed to it in the form of scalars. To function in this manner, the SPU 110 includes a vector-to-scalar interface that converts input data from vector form into scalar form. The SPU 110 then performs one or more scalar-based operations on the input data in scalar form. The SPU 110 then uses a scalar-to-vector interface that converts output data from scalar from to vector form.

By virtue of the above-described design, the SPU 110 can be programmatically treated in the same manner as the tensor-processing engine 108. For example, in one implementation, a developer can use the same kind of write instruction to write an input vector to either the tensor-processing engine 108 or the SPU 110. Similarly, the developer can use the same kind of read instruction to read a vector from the tensor-processing engine 108 or the SPU 110. Later figures and accompanying explanation will clarify the manner in which the hardware accelerator 104 achieves the above results.

Figure 2:
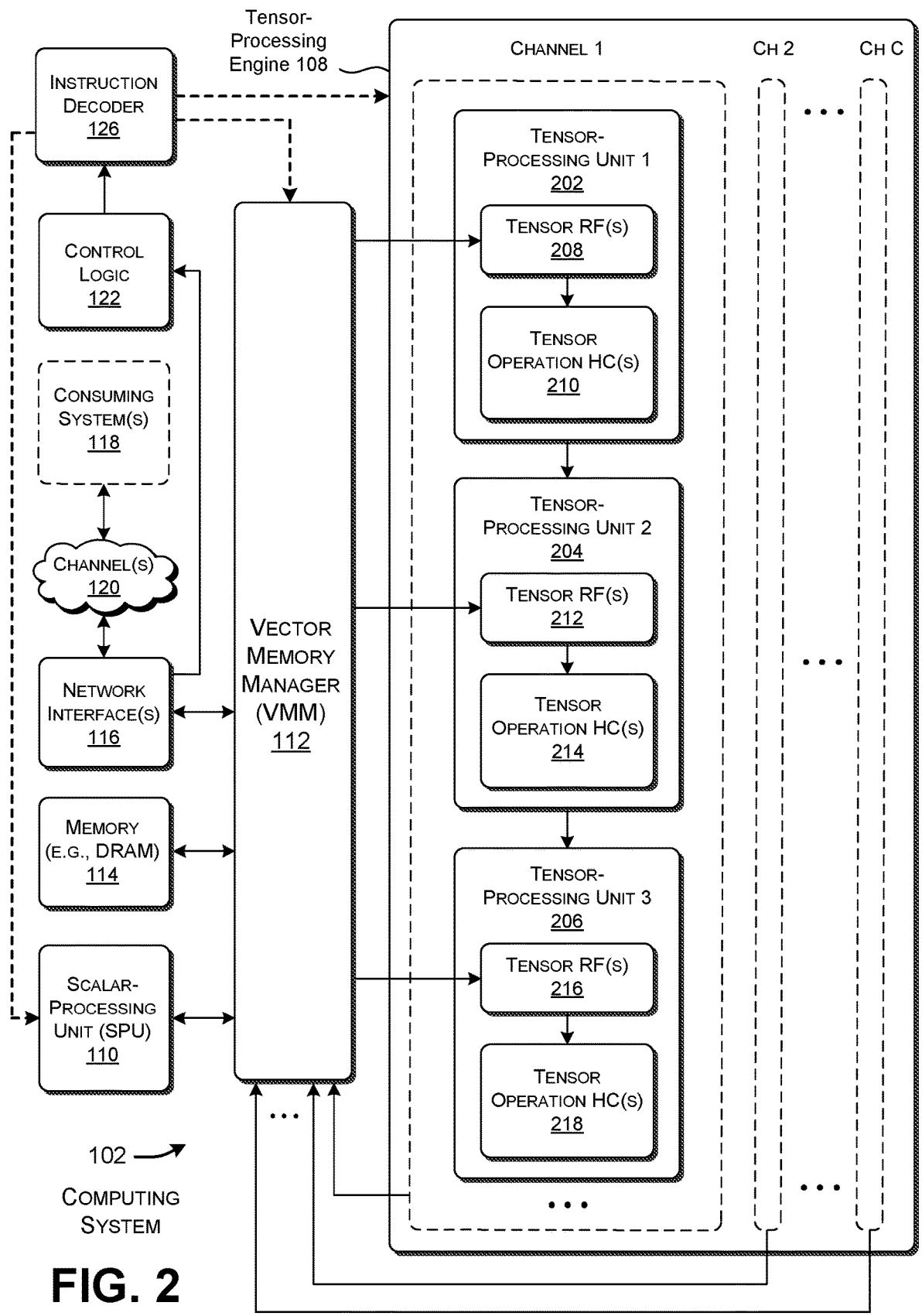
FIG. 2 shows a more detailed view of the computing system of FIG. 1.
Figure 3:
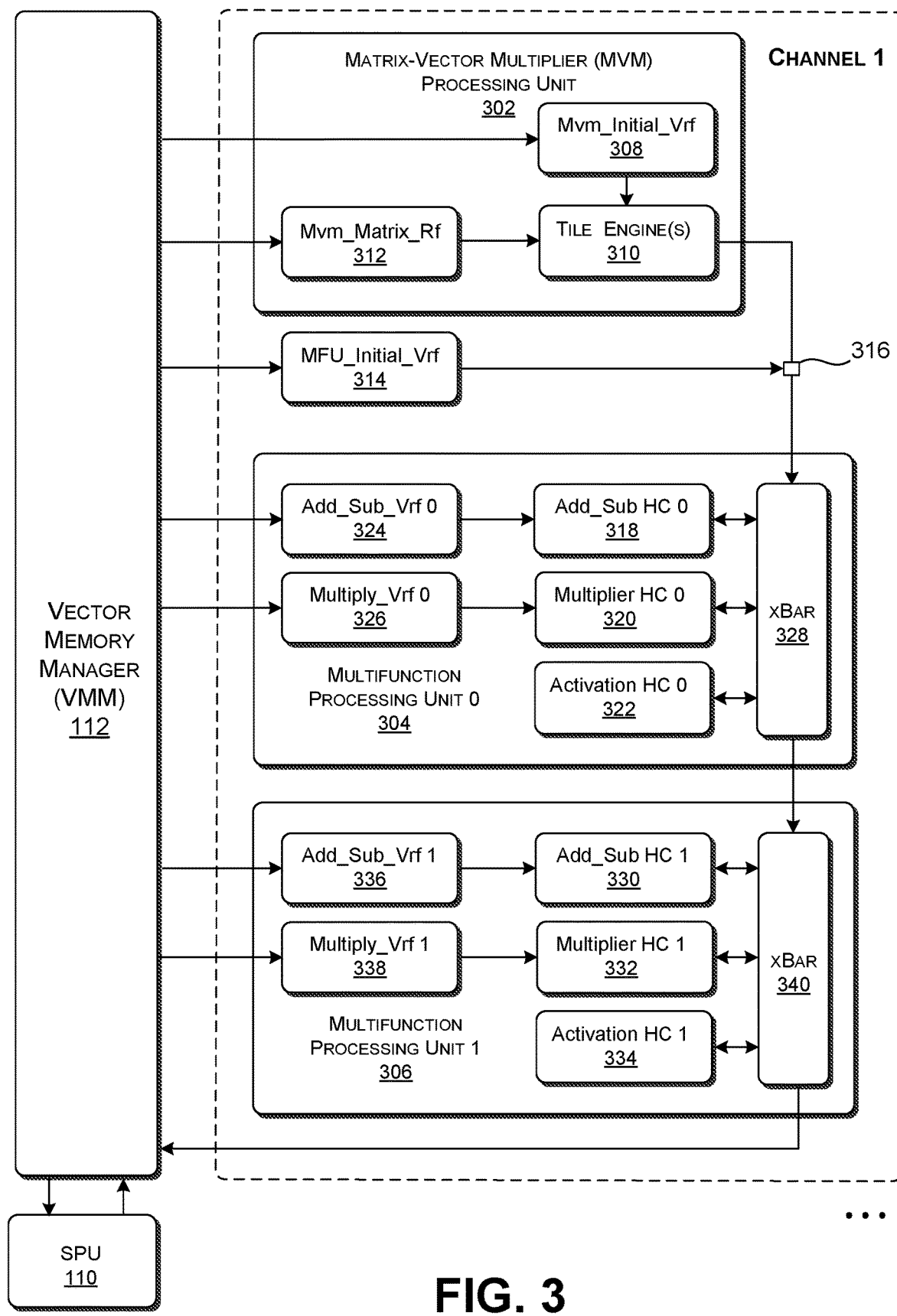
FIG. 3 shows one implementation of the tensor-processing engine provided by the computing system of FIGS. 1 and 2.

FIGS. 2 and 3 show a more detailed depiction of the tensor-processing engine 108 of the computing system 102 of FIG. 1. These details are presented in the spirit of illustration, not limitation. Other implementations can use tensor-processing engines that have any other architecture compared to that set forth below. Further, other implementations can use tensor-processing engines that provide any other kind of tensor-processing flow compared to that set forth below.

The tensor-processing engine 108 shown in FIG. 2 includes plural channels (channel 1, channel 2, . . . , channel C). FIG. 1 shows illustrative details of the first channel (channel 1). Other channels include the same components. Different implementations of the tensor-processing engine 108 can allocate work to different channels based on different environment-specific considerations. For instance, assume that the computer program 124 includes at least one loop that involves repeating the same series of operations. The instruction decoder 126 can allocate work associated with different iterations of the loop to different respective channels. This allows the tensor-processing engine 108 to perform work associated with the different iterations in parallel.

Further note that the tensor-processing engine 108 can exploit other dimensions of parallelism in performing its tasks. For example, consider the case in which the computer program 124 specifies that an input vector is to be multiplied by a matrix. The tensor-processing engine 108 can break this task into the subtasks of multiplying the input vector by each row of the matrix, and then perform these subtasks in parallel.

As shown, in this non-limiting implementation, the first (representative) channel provides a processing pipeline composed of two or more tensor-processing units (e.g., tensor-processing unit 202, tensor-processing unit 204, and tensor-processing unit 206). In other implementations, each channel can include fewer or additional tensor-processed processing units. Each tensor-processing unit includes one or more tensor register files (RFs) and one or more tensor operation hardware components (HCs). More specifically, the first tensor-processing unit 202 includes one or more tensor RFs 208 and one or more tensor operation HCs 210, the second tensor-processing unit 204 includes one or more tensor RFs 212 and one or more tensor operation HCs 214, and the third tensor-processing unit 206 includes one or more tensor RFs 216 and one or more tensor operation HCs 218. As set forth above, a tensor RF stores data in tensor form, e.g., as matrices or vectors. A tensor operation HC performs a function in tensor form. For example, one kind of tensor operation HC can multiply a vector by a matrix. Another tensor operation HC can add a first vector to a second vector, and so on. FIG. 3 (described below) provides additional information regarding one possible allocation of operations among the tensor-processing units (202, 204, 206).

The first channel forms a pipeline in the sense that the output data from the first tensor-processing unit 202 serves as input data that feeds into the second tensor-processing unit 204. And the output data from the second tensor-processing unit 204 serves as input data that feeds into the third tensor-processing component 206. Each individual tensor-processing unit also organizes its tensor operation HCs in a pipeline. For example, consider the case in which the second tensor-processing unit 204 includes three tensor operation HC. The first tensor operation HC provides output data that serves as input data that feeds into the second tensor operation HC, and the second tensor operation HC provides output data that serves as input data that feeds into the third tensor operation HC. However, the computer program 124 may only invoke a subset of tensor operation HCs in any given tensor-processing unit.

In one implementation, a developer writes the computer program 124 (shown in FIG. 1) in a manner that leverages the order in which functions are performed in the above-described pipeline. For example, assume that a tensor-processing engine 108 includes a tensor operation HC that performs vector multiplication, which is followed by a tensor operation HC that performs vector addition or subtraction. In view of this order, the developer may write a program in which the instruction that identifies the multiplication operation precedes the instruction that identifies the addition or subtraction operation. More generally stated, a developer writes programs that specify chains of operations to be performed by the processing engines 106. The developer creates these chains based on a consideration of the order in which tensor operation HCs are laid out in the tensor-processing engine 108. Further note that, in many cases, the computer program 124 instructs the tensor-processing engine 108 to repeat one or more chains of operations over a specified number of iterations. The tensor-processing engine 108 can implement this manner of operation by executing plural passes through the pipeline shown in FIG. 2, for each channel.

In some cases, the tensor-processing engine 108 may include at least one tensor operation HC that, as a default rule, receives input data from a preceding ("upstream") tensor operation HC. This behavior eliminates or reduces the need for the computer program 124 to explicitly identify the source of this input data. It also eliminates the need to allocate a dedicated register to store the input data. In the above example, the tensor operation HC that performs the addition or subtraction operation receives a first operand from the preceding tensor operation HC that performs the multiplication operation, without requiring the developer to explicitly identify the source of this input data in the computer program 124; it may receive the second operand from a vector-based RF that is specifically associated with the tensor operation HC that performs addition or subtraction.

FIG. 2 shows that tensor-processing engine 108 interacts with the SPU 110 via the vector memory manager (VMM) 112. More specifically, in this configuration, the VMM 112 treats the SPU 110 in the same manner as any memory, such as the memory 114. That is, the VMM 112 can send write requests to the SPU 110, which operate to send input vectors to the SPU 110 for processing. The VMM 112 can also send read requests to the SPU 110, which serve to pull output vectors from the SPU 110. But other implementations can integrate the SPU 110 into the computing system 102 using other respective connection strategies. For example, in another implementation, any tensor-processing unit can include an instantiation of the SPU 110, optionally along with one or more tensor operation HCs. In another case, the VMM 112 itself incorporates the SPU 110.

In one implementation, the tensor-processing engine 108 of FIG. 2 processes matrices having a native matrix size, such as N rows and N columns. Likewise, the tensor-processing engine 108 processes vectors having a prescribed native vector size, such as 1×N elements. The tensor-processing engine 108 can process vectors having a dimension greater than N by treating two or more vectors of degree N as a single unit, to be processed over two or more consecutive instructions cycles. The tensor-processing engine 108 can handle vectors having a dimension less than N by padding the vector with dummy values, until it includes N dimensions. Likewise, the tensor-processing engine 108 can process matrixes having dimensions larger or smaller than N×N using the above strategies. The SPU 110 handles non-native-sized vectors in a manner that will be explained below.

FIG. 3 shows a yet more concrete (yet still illustrative and non-limiting) example of the processing pipeline associated with the first channel. Again, other channels can include the same series of tensor-processing units, although not specifically shown in FIG. 3.

In this example, a first tensor-processing unit corresponds to a matrix-vector multiplier (MVM) processing unit 302. The MVM processing unit 302 performs the main task of multiplying a vector by a matrix. A second tensor-processing unit corresponds to a multifunction processing unit 304 that performs two or more different kinds of vector-based operations. A third tensor-processing unit corresponds to another multifunction processing unit 306 that performs two or more different kinds of vector-based operations. The pipeline shown in FIG. 3 can include yet additional MVM processing units and/or multifunction processing units. As shown, the MVM processing unit 302 forwards the results of it computations as input data to the first multifunction processing unit 304, and the first multifunction processing unit 304 forwards the results of its computations as input data to the second multifunction processing unit 306.

More specifically, the MVM processing unit 302 includes a first tensor register file (Mvm_Inital_Vrf 308) that stores an input vector that feeds into one or more tile engines 310. A second tensor register file (Mvm_Matrix_Rf 312) includes an input matrix that feeds into the tile engine(s) 310. The tile engine(s) 310 multiply the vector retrieved from the Mvm_Initial_Vrf 308 by the matrix retrieved from the Mvm_Matrix_Rf 312. Each tile engine may include an architecture (not shown) that includes plural dot product engines that operate in plural lanes. In one configuration, each dot product engines multiplies the input vector by a row of the input matrix. It performs this operation in parallel on an element-by-element basis, and then sums the results across the dimensions of the input vector. Further, the MVM processing unit 302 can include one or more accumulators (not shown) that sum the output results of the plural dot product engines.

The first multifunction processing unit 304 receives an initial vector from an initial register file (MFU_Intial_Vrf 314). It also receives tensor output data provided by the MVM processing unit 302. A tensor arbiter 316 controls what input data is fed to the first multifunction processing unit 304. In the merely illustrative case of FIG. 3, the first multifunction processing unit 304 includes three tensor operation HCs: an Add_Sub HC 318 that adds two vectors together or that subtracts a first vector from a second vector; a Multiplier HC 320 that multiplies two vectors together; and an Activation HC 322 that executes a neural network activation function on an input vector (such as the hyperbolic tangent function, the sigmoid function, the ReLU function, etc.). A first register file (Add_Sub_Vrf 324) supplies a vector operand to the Add-Sub HC 318. The other vector operand of the Add-Sub HC 318 originates from some preceding source, such as the MVM processing unit 302, the MFU_Initial_Vrf 314, etc. A second register file (Multiply_Vrf 326) supplies a vector operand to the Multiplier HC 320. The other vector operand of the Multiplier HC 318 originates from some preceding source, such as Add-Sub HC 318 (if used), the MFU_Initial_Vrf 314, etc. The input to the Activation HC 322 originates from some preceding source, such as the Multiplier HC 320, the Add-Sub HC 318, the MFU_Initial_Vrf 314, etc. A cross bar (xBar) 328 operates as a conduit that passes information in a top-down fashion, e.g., by passing data from the MVM processing unit 302 or the MFU_Initial_Vrf 314 to the Add-Sub HC 318, by passing data from the Add_Sub HC 318 to the Multiplier HC 320, and so on.

The second multifunction processing unit 306 receives input data from the first multifunction processing unit 304. It includes the same components as the first multifunction processing unit 304, including: an Add_Sub HC 330, a Multiplier HC 332, an Activation HC 334, an Add_Sub_Vrf 336, a Multiply_Vrf 338, and an xBar 340. Note that the computer program 124 need not utilize all of the tensor HCs in each multifunction unit. For example, the computer program 124 may not use the Add_Sub HC 318 in the first multifunction processing unit 304; this hardware component can thus be considered deactivated. On the other hand, the computer program 124 may not use the Multiplier HC 332 in the second multifunction processing unit 306; this hardware component can therefore be considered deactivated. Further note that the kinds of tensor-based operations shown in FIG. 3 are presented in the spirit of illustration, not limitation; other implementations can use other kinds of tensor-based functions, and/or can omit one or more of the tensor-based functions shown in FIG. 3.

More generally, as noted above, the SPU 110 can work in association with other types of tensor-processing engine architectures and tensor-processing flows compared to those shown in FIGS. 1 and 2. In one variation of the architecture described above, the tensor-processing engine 108 includes a single tensor-processing unit having one or more tensor register files and any combination of tensor operation HCs. In another variation, the tensor-processing engine 108 does not necessarily arrange its tensor operation HCs in a series (i.e., in a pipeline). For instance, the tensor-processing engine 108 can provide a bus or other kind of routing logic that directly connects one or more tensor RFs to each tensor operation HC.

Figure 4:
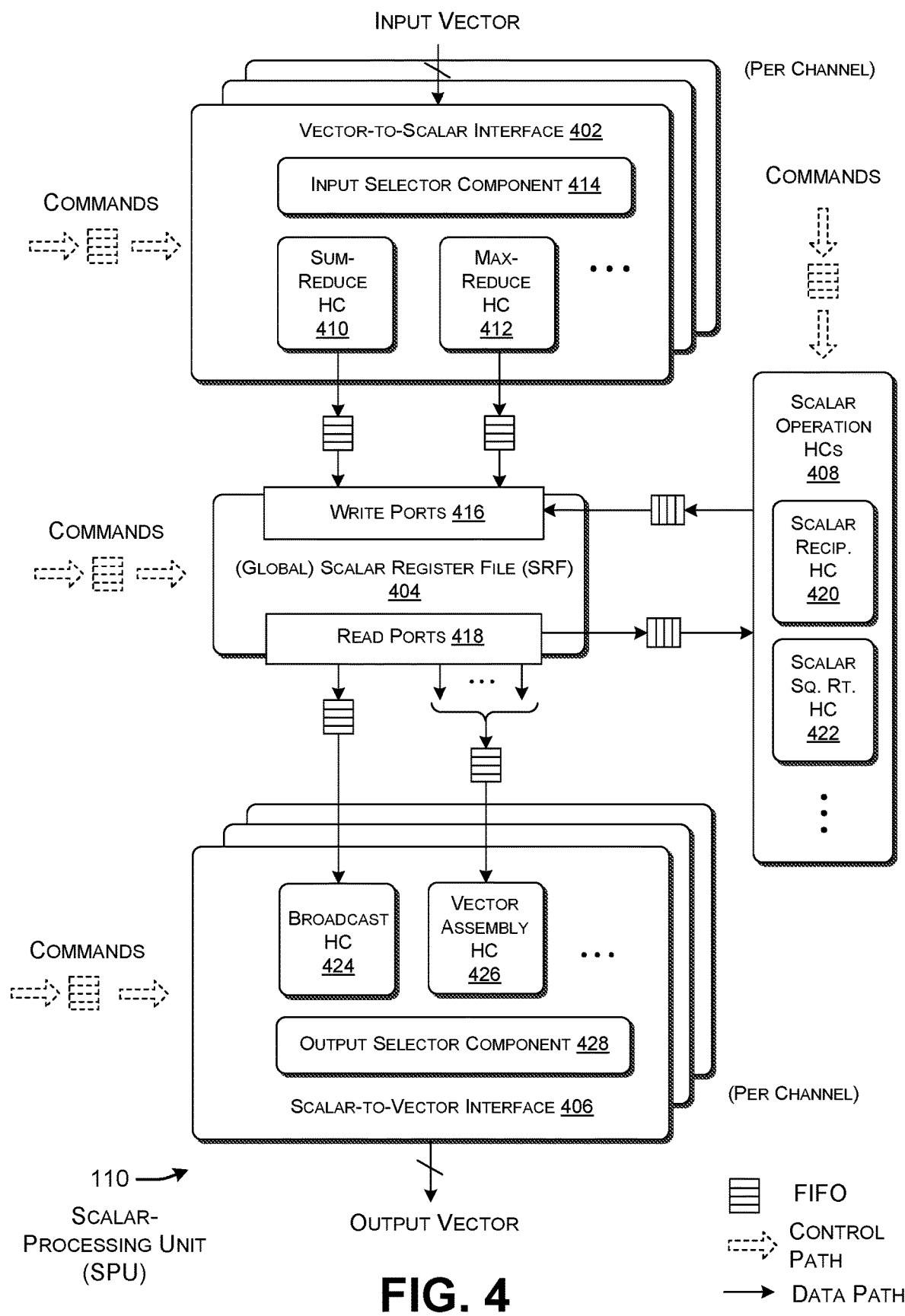
FIG. 4 shows one implementation of the scalar-processing unit provided by the computing system of FIGS. 1 and 2.

FIG. 4 shows one implementation of the scalar-processing unit (SPE) 110 introduced above. The principal components of the SPE 110 include a vector-to-scalar interface 402, a scalar register file (SRF) 404, a scalar-to-vector interface 406, and a set of scalar operation hardware components (HCs) 408. The vector-to-scalar interface 402 converts an input vector into scalar form. The SRF 404 stores the scalar(s) provided by the vector-to-scalar interface 402 at respective write addresses. The scalar-to-vector interface 406 converts one or more scalars read from the SRF 404 into vector form. And the scalar operation HCs 408 perform respective scalar operations on scalars read from the SRF 404; after each such scalar operation, a scalar operation HC writes a scalar result value to the SRF 404. The following explanation describes the operation of each of these components in turn.

Generally note that FIG. 4 indicates that the different components of the SPU 110 perform their operations based on commands provided by the instruction decoder 126. Further, the SPU 110 buffers data and input commands in various first-in-first-out (FIFO) buffers. Further note that each component of the SPU 110 can be visualized as including a controller in combination with logic that carries out instructions from the controller. For example, the scalar operation HCs 408 can be conceptualized as a scalar controller that interacts with logic components that carry out instructions from the scalar controller.

Scalar-to-Vector Interface

Beginning with the vector-to-scalar interface 402, this component converts an input vector into at least one scalar using different selectable kinds of hardware components (HCs). For example, a sum-reduce HC 410 uses tree reduction to sum the values associated with the elements in the input vector. A max-reduce HC 412 uses tree reduction to determine the maximum value among the element values included in the input vector. A minimum HC (not shown) uses tree reduction to determine the minimum value among the element values included in the input vector. An argmax HC (not shown) determines the index associated with the element in the input vector that has a maximum value, e.g., by using tree reduction to identify the maximum value and then recording the index associated with this maximum value. An argmin HC (not shown) determines the index associated with the element in the input vector that has a minimum value, and so on. These types of vector-to-scalar HCs are set forth here in the spirit of illustration, not limitation; other implementations can use other HCs that convert a vector into at least one scalar. Further note that, in most scenarios, the vector-to-scalar interface 402 uses a single hardware component to process an input vector. But it can also apply two or more hardware components to produce two or more scalars, e.g., by using the sum-reduce HC 410 to determine the sum of element values in an input vector and using the max-reduce HC 412 to determine the maximum element value in the input vector.

The vector-to-scalar interface 402 may perform its work in multiple instruction cycles in some input scenarios. In one such scenario, the vector-to-scalar interface 402 processes input vectors having a width w that is less than the native vector size N of vectors processed by the tensor-processing engine 108. In another case, the vector-to-scalar interface 402 receives a group of input vectors, each of size N, along with control information indicating that the group of native vectors is to be treated as a single unit. In these cases, the vector-to-scalar interface 402 performs its scalar extraction operation in two or more phases.

To address the first-mentioned input scenario, the vector-to-scalar interface 402 can include an optional input selector component 414 that operates to select a portion of an input vector. For example, assume that an input vector includes N dimensions, but the SRF 404 is designed to accept a set of w vector elements, where w<N. In this case, the input selector component 508 can select the first w elements of the input vector in a first pass, and the remaining elements of the input vector in one or more subsequent passes.

Each hardware component of the vector-to-scalar interface 402 can also adapt its behavior to process input vector data in piecemeal form. More specifically, consider the example in which the input vector has a size of N (for example, 300 elements), while the width w of the sum-reduce HC 410 is 100 elements—that is, one third of N. The sum-reduce HC 410 handles this scenario by consecutively processing three component input vectors, each having a size that is one third of N (i.e., 100 elements). That is, the sum-reduce HC 410 can process the first component input vector to produce a first sum. It then may internally store the first sum in the sum-reduce HC 410. The sum-reduce HC 410 can process the second component input vector along with the first sum to produce a second sum, e.g., by adding the sum of the element values in the second component input vector to the first sum. The sum-reduce HC then internally stores the second sum. Similarly, the sum-reduce HC 410 can process the third component input vector along with the second sum to produce a third and final sum, e.g., by adding the sum of element values in the third component input vector to the second sum. The sum-reduce HC 410 then outputs the third and final sum.

In an alternative implementation, the sum-reduce HC 410 can store each intermediary sum it produces in the scalar register file (SRF) 404, that is, instead of internally storing the intermediary sum in the sum-reduce HC 410 itself. Upon processing each new component input vector, the sum-reduce HC 410 can execute a read-write-modify operation by: (1) pulling the most recent intermediary sum from the SRF 404; (2) adding the values associated with the current component input vector to the intermediary sum; and (3) writing the updated sum back to the SRF 404 at the same address location.

In some implementations, the computing system 102 can initialize a storage location in the SRF 404 prior to a multi-pass reduction operation. For example, at the beginning of a multi-pass sum-reduction operation, the control logic 122 can store the value of 0 in a location at which the sum-reduce HC 410 will store its sum. Alternatively, the sum-reduce HC 410 can be configured to suppress the read operation of an initial read-modify-write operation. Both examples will prevent a value that is initially stored in the SRF 404 at the outset of a sum-reduction operation (if any) from corrupting the sum.

Different input scenarios may further complicate the above-described manner of operation. For example, in some cases, the vector-to-scalar interface 402 may receive an input vector that is padded with dummy values. These dummy values can potentially corrupt the determinations made by the vector-to-scalar interface 402. The potential for corruption depends on what kind of hardware component the vector-to-scalar interface 402 uses to produce a scalar, and the type of dummy values added to the input vector. For example, consider the case in which the vector-to-scalar interface 402 uses the max-reduce HC 412 to determine the maximum value within an input vector. Assume that all of the valid elements of the input vector have negative values, and each dummy value has the value of 0. The max-reduce HC 412 will incorrectly determine that the maximum value in the input vector is zero.

To address this problem, the max-reduce HC 412 can receive an input vector along with an input parameter ("logical length") that specifies the logical length of the input vector. For example, assume that the native vector length is 300, but only the first 200 elements of an input vector correspond to valid values. The remaining 100 elements correspond to dummy values. In addition to receiving the input vector, the max-reduce HC 412 receives a logical length value that identifies the logical length of the input vector (here corresponding to 200 elements). The max-reduce HC 412 leverages the logical length value to determine the maximum value in the first 200 elements of the input vector, ignoring the dummy values that populate the last 100 elements of the input vector.

An argmax HC (not shown) differs from the sum-reduce HC 410 and the max-reduce HC 412 because it must propagate multiple values over multiple respective instruction cycles (in which the argmax HC processes plural component input vectors). These values include the maximum value encountered thus far, and the index value of the element associated with the maximum value. The argmax HC internally stores these two pieces of information, or stores these two pieces of information at different respective storage locations of the SRF 404.

Different implementations can update the index value across plural iterations in different respective ways. Consider the concrete case in which the input vector has a size of 300 and the width w of the argmax HC is 100 elements. In one merely illustrative example, the argmax HC stores a base index value that identifies the segment of the input vector that it is currently being processed. That is, the base index value is 0 when the argmax HC processes the first hundred elements of the input vector (elements 1 to 100); the base index value is 100 when the argmax HC processes the next hundred elements of the input vector (elements 101 to 200); and the base index value is 200 when the argmax HC processes the last hundred elements of the input vector (elements 201 to 300). The argmax HC can update the index by: (1) determining whether the segment of the input vector under consideration has a value that is greater than any previously-encountered value of the 300-element input vector; (2) if so, storing an updated maximum value; (3) determining an offset index value that indicates where the maximum value occurs in the vector segment currently under consideration; (4) adding this offset index value to the current base index value (where the base index value identifies the vector segment currently under consideration), to provide an updated index value; and (5) storing the updated index value.

Note that the operation of the vector-to-scalar interface 402 has been described above in the context of particular kinds of hardware components e.g., the sum-reduce HC 410, the max-reduce HC 412, and the argmax HC (not shown). But the same principles apply to any other hardware component used by the vector-to-scalar interface 402.

Scalar Register File

The scalar register file (SRF) 404 includes a collection of write ports 416 having respective write addresses, and a collection of read ports 418 having respective read addresses. The vector-to-scalar interface 402 writes scalars to the write ports 416. The scalar-to-vector interface 406 retrieves one or more stored scalars from the SRF 404 from the read ports 418.

In one implementation, the SRF 404 represents a global resource that is shared across the processing pipelines in the channels of the computing system 102. That is, each tensor-processing unit interacts with the same SRF 404. But the SPU 102 can include plural instantiations of the vector-to-scalar interface 402 and plural instantiations of the scalar-to-vector interface 406. For example, the SPU 110 can allocate a separate instance of the vector-to-scalar interface 402 and a separate instance of the scalar-to-vector interface 406 to each channel, and/or to each tensor-processing unit within each channel, etc. This means that the vector-to-scalar interfaces associated with different components of the tensor-processing engine 108 operate in parallel. Each instantiation of the vector-to-scalar interface 402 stores its results in prescribed locations in the global SRF 404. Likewise, the scalar-to-vector interfaces associated with different components of the tensor-processing engine 108 operate in parallel. Each instantiation of the scalar-to-vector interface 406 pulls scalar values from prescribed locations of the global SRF 404.

Scalar Operation Hardware Components

A collection of scalar operation hardware components (HCs) 408 perform respective scalar-based operations. More specifically, each scalar operation HC retrieves one or more scalars from the SRF 404 via the read ports 418, performs some scalar-based function on the retrieved scalar(s) to generate one or more output scalars, and then writes the output scalar(s) back into the SRF 404 via the write ports 416. This constitutes a read-modify-write operation. For example, a scalar reciprocal HC 420 reads a scalar x at a specified memory location in the SRF 404, generates the reciprocal of the scalar (1/x), and then writes the output result scalar to a specified memory location in the SRF 404. A scalar square root HC 422 reads a scalar x to a specified memory location in the SRF 404, generates the square root of the scalar ($\sqrt{x}$), and then writes the output result scalar to a specified memory address.

The above-described scalar operations are presented in the spirit of illustration, not limitation; other implementations can include any subset of scalar HCs. For example, another implementation can provide a scalar operation HC that performs a multiplication operation, a scalar operation HC that performs an addition operation, etc. Note that these kinds of scalar operation HCs receive two input operands, while the scalar reciprocal operation HC 420 and the scalar square root HC 422 each receive one input operand. In generally, a scalar operation HC can receive any number of input operands and provide any number of output results.

Still another kind of scalar operation HC executes a shift operation by reading a set of scalar values from first respective locations in the SRF 404 and storing them in second respective storage locations in the SRF 404. Another kind of scalar operation HC performs operations in a condition manner, e.g., based on one or more input parameter values supplied to the SPU 110. Another kind of scalar operation HC performs a masking operation by selectively reading values within a larger set of values, etc.

Note that a particular computer program 124 can invoke any of the scalar operation HCs or no scalar operation HCs. In the latter case, the computing system 102 uses a hardware component of the vector-to-scalar interface 402 to perform some reduction operation on the input vector, to produce at least one scalar; then, the computing system 102 uses some hardware component of the scalar-to-vector interface 406 to produce an output vector based on the scalar(s) provided by the vector-to-scalar interface 402, without any further transformation provided by a scalar operation HC.

Scalar-to-Vector Interface

The scalar-to-vector interface 406 includes one or more hardware components (HCs) that convert one or more scalars read from the SRF 404 into an output vector (or plural component output vectors). For example, a broadcast HC 424 reads a single scalar from the SRF 404 and then replicates this scalar across all elements of an output vector of N dimensions.

A vector assembly HC 426 reads plural scalars from the SRF 404 stored at different respective memory locations. It then assembles these scalars into one or more output vectors. In one implementation, the SPU 110 generates these plural scalar values in plural respective scalar operations, performed over plural instruction cycles. For example, the SPU 110 can determine the maximum of each column of a matrix in plural consecutive operations, and store each maximum value at a prescribed location in the SRF 404. The vector assembly HC 426 can read those maximum values from the SRF 404 and assemble them into an output vector; that output vector expresses the maximum values across different columns of the matrix.

The vector assembly HC 426 can also insert scalars at appropriate locations in the composite output vector based on index information stored in the SRF 404. In other words, the scalar-to-vector interface 406 includes logic that complements the logic that the vector-to-scalar interface 402 uses to process plural component input vectors. For example, the scalar-to-vector interface 406 can determine the placement of an element value in an output vector assembled from plural segments based on a base index value (that identifies the segment under consideration) and an offset index value (that identifies the location of the element in the segment under consideration).

Assume that the scalar-to-vector interface 406 has a width w that is less than the native vector length N. In this case, an output selector component 428 can concatenate plural component output vectors of size w to generate a composite output vector of size N.

Programmatic Interface of the SPU

As explained above, in one non-limiting implementation, the computing system 102 can provide an input vector to the SPU 110 by executing a write instruction included in the computer program 124. The first operand of the write instruction identifies the particular kind of hardware component in the vector-to-scalar interface 402 that is to be used to convert the input vector into a scalar. For example, the identifier "Spu_Max_Reduce" instructs the vector-to-scalar interface 402 to use the max-reduce HC 412 to process the input vector, e.g., by determining the maximum element value in the input vector. The second operand in the write instruction identifies the memory location at which the maximum value is to be stored in the SRF 404, e.g., "spu_accum."

The computing system 102 can retrieve an output vector from the SPU 110 by executing a read instruction included in the computer program 124. The first operand of the read instruction identifies the particular kind of hardware component in the scalar-to-vector interface 406 that is to be used to convert one or more scalars into the output vector. For example, the identifier "Spu_Broadcast" instructs the scalar-to-vector interface 406 to use the broadcast HC 424 to retrieve a scalar from the SRF 404 and replicate it across the dimensions of the output vector. The second operand of the read instruction specifies the location at which the scalar is stored in the SRF 404.

Optional Vector-Based Interfaces of the SPU

Figure 5:
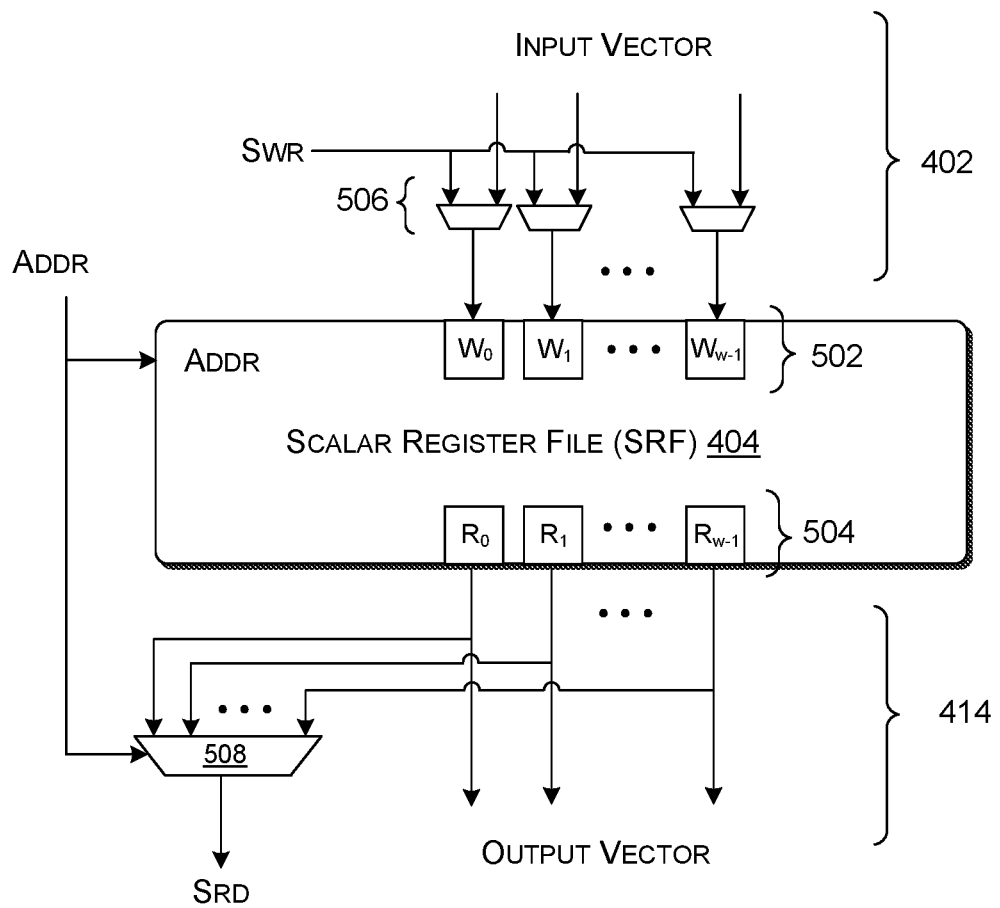
FIG. 5 shows an alternative implementation of parts of the scalar-processing unit shown in FIG. 4.

FIG. 5 shows an alternative implementation of parts of the SPU 110, compared to the example of FIG. 4. In this case, the vector-to-scalar interface 402 includes a mechanism for reading an entire input vector into respective write addresses 502 of the SRF 404 at the same time. Each individual write address can be said to store a scalar, corresponding to one of the element values of the input vector. The SPU 110 can then perform scalar operations on any scalar associated with an individual write address. The scalar-to-vector interface 406 also includes a mechanism for reading an entire input vector from respective read addresses 504 of the SRF 404.

More specifically, the vector-to-scalar interface 402 can include a collection of multiplexers 506 that govern whether the SRF 404 is to receive a set of scalars or an individual scalar. For example, the SRF 404 can receive a set of scalars when the computing system 102 instructs it to receive and store an entire input vector at the same time. The scalars correspond to the element values of the input vector. The SRF 404 can receive an individual scalar (for instance) when an individual scalar operation HC instructs the SRF 404 to store a calculated new scalar, e.g., by storing the square root of an input value x.

The scalar-to-vector interface 402 can include a multiplexer 508 that governs whether the SRF 404 supplies a single output scalar or a set of output scalars at the same time. In the former case, the SRF 404 may read out a single scalar to the broadcast HC 424 (of FIG. 4), or as input to a scalar operation HC. The broadcast HC 424 can then replicate the single scalar to form the output vector. In the latter case, the SRF 404 reads out a set of scalars at the same time.

The alternative implementation of FIG. 5 accommodates particular kinds of scalar operations. For example, the computing system 102 can use the functionality of FIG. 5 to receive a complete input vector, which it stores at respective write locations in the SRF 404. A scalar operation HC can then operate as a selector that reads a particular scalar within the input vector, e.g., by specifying the index value of the desired element of the input vector. In one case, the SPU 110 can determine the index value in a preceding argmax reduction operation.

The computing system 102 described above has various technical advantages. For instance, the computing system 102 can seamlessly integrate scalar operations in a processing data flow otherwise directed to tensor-based operations. The computing system 102 achieves this result by using the same vector-based interface to write data, regardless of whether the destination of that data is a tensor-processing unit or the SPU 110. It also uses the same vector-based interface to read data, regardless of whether the data originates from a tensor-processing unit or the SPU 110. These characteristics also facilitate the task of writing computer programs. A developer can use the same kinds of programmatic instructions to control the tensor-processing engine 108 and the SPU 110.

The efficiency of the computing system 102 can be gauged by comparing it to two alternatives. In a first alternative, a computing system may express scalars in vector form, e.g., by adding dummy values to the scalars to produce vectors. The computing system then performs operations in vector-based form. This alternative solution, however, is not efficient because it is involves adding a wasteful amount of padding to scalars to produce vectors. This alternative solution may also rely on a slow and cumbersome technique for extracting scalars from vectors, e.g., involving iteratively shifting and/or masking a vector. The present computing system 102 shown in FIGS. 1 and 2 dispenses with these drawbacks by providing a technique for directly operating on scalars in scalar form within a data flow otherwise directed to tensor-based computations.

In a second alternative, a computing system can use a general-purpose CPU to handle scalar operations. This alternative solution requires a tensor-processing engine to transfer data to a shared memory. The CPU retrieves the data from the shared memory and operates on it. This alternative solution is not efficient because it requires the inclusion of a CPU to perform what is typically only a small number of scalar operations (in proportion to the bulk of processing operations, which occur in tensor space). In other words, this alternative solution wastes most of the resources of the general-purpose CPU. This alternative solution also uses a slow and cumbersome technique to transfer information between the tensor-processing engine and a general-purpose CPU. The present computing system 102 shown in FIGS. 1 and 2, by contrast, relies on a dedicated SPU 110 having scalar operation HCs. The SPU 110 includes logic that is specifically configured to operate with the tensor-processing engine 108, and thus does not include wasted resources to the same extent as a general-purpose CPU. The tensor-processing engine 108 can also interact with the SPU 110 with comparatively low latency because the SPU 110 operates as a native element of a vector-based data flow.

Example 1: Softmax

Figure 6:
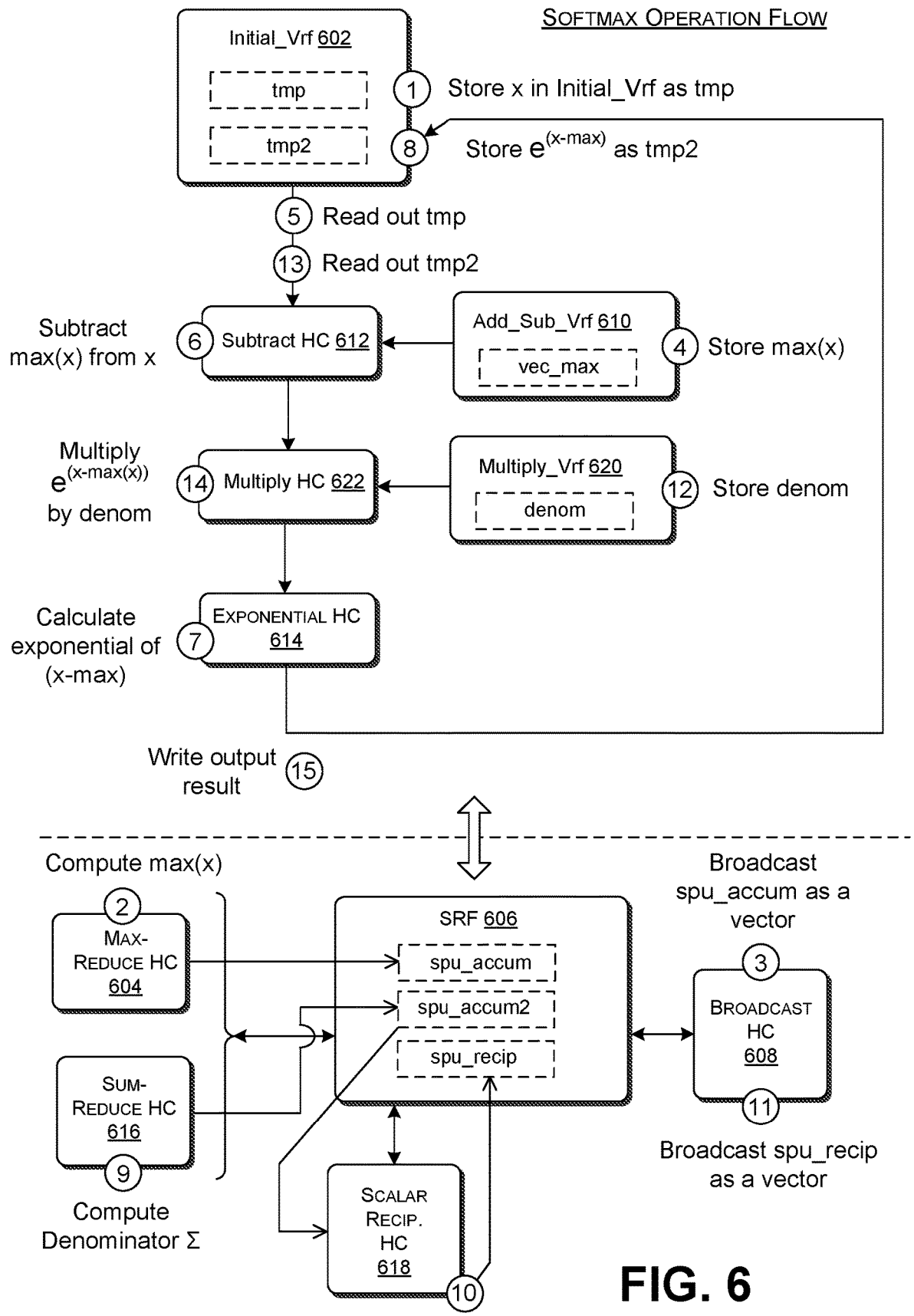
FIG. 6 shows an example of how the computing system of FIGS. 1 and 2 can be used to perform a softmax (normalized exponential function) operation.

FIG. 6 shows an example of how the computing system 102 of FIGS. 1 and 2 can be used to perform a softmax (normalized exponential function) operation. Mathematically, the softmax operation operates on an input vector x as follows:

$$\frac{e^{x_i - max(x)}}{\sum_i e^{x_i - max(x)}}$$

In other words, the softmax operation determines the maximum value among the elements of a vector x (i.e., max(x)), and then subtracts that maximum value from each element value of the input vector x, to yield a set of element-wise differences ($x_i$-max(x)). It then computes e raised to the power of each difference value, to yield a set of exponential difference values. It then normalizes each exponential difference value by the sum of exponential difference values (corresponding to the denominator of the above equation).

Assume that the computer program 124 expresses the software operation using the following code:
1. v_wr(Initial_Vrf, tmp)
2. v_wr(Spu_Max_Reduce, spu_accum)
3. v_rd(Spu_Broadcast, spu_accum)
4. v_wr(Add_Sub_Vrf, vec_max)
5. v_rd(Initial_Vrf, tmp)
6. vv_sub(Add_Sub_Vrf, vec_max)
7. vv_exp( )
8. v_wr(Initial_Vrf, tmp2)
9. v_wr(Spu_Sum_Reduce, spu_accum2)
10. s_recip(spu_accum2, spu_recip)
11. v_rd(Spu_Broadcast, spu_recip)
12. v_wr(Multiply_Vrf, denom)
13. v_rd(Initial_Vrf, tmp2)
14. vv_mul(denom)
15. v_wr(<dest mem id>, result)

Assume that the top portion of FIG. 6 corresponds to components provided by one or more tensor-processing units of the tensor-processing engine 108, such as one or more multifunction units. Assume that the bottom portion of FIG. 6 corresponds to components provided by the SPU 110. Instructions performed by the SPU 110 are presented in boldface type in the above computer program; the remaining operations are performed by the tensor-processing engine 108

In operation (1), the computing system 102 executes a write command, which causes the tensor-processing engine 108 to write an initial vector that expresses the input vector x to a vector register file named Initial_Vrf 602, at a memory address associated with "tmp." In operation (2), the computing system 102 executes a write to a max-reduce HC 604 (associated with the memory ID "Spu_Max_Reduce"). This causes the max-reduce HC 604 to compute the maximum value of x and store that scalar in a scalar register file (SRF) 606 at a location associated with the memory index "spu_accum." In operation (3), the computing system 102 executes a read operation to a broadcast HC 608, which causes the broadcast HC 608 to retrieve a scalar stored at "spu_accum" and replicate it across the dimensions of an output vector. In operation (4), the computing system 102 executes a write command that stores the replicated maximum value in a vector register file 610 called "Add-Sub_Vrf," at a memory location associated with "vec_max."

In operation (5), the computing system 102 executes a read command that reads the value x from the input register file Initial_Vrf 602. In operation (6), the computing system 102 uses a Subtract HC 612 to subtract the vector vec_max in Add_Sub_Vrf 610 from the vector x in the vector register file Initial_Vrf 602. In this case, the subtract command implicitly identifies the vector x in the vector register file Initial_Vrf 602 as its first operand. In operation (7), the computing system 102 uses an exponential HC 614 to compute e raised to the power of ($x_i$-max(x)). In operation (8), the computing system 102 stores the results of operation (7) at a location identified by "tmp2" in the vector register file 602.

In operation (9), the computing system 102 uses a sum-reduce HC 616 to compute the denominator of the above-described equation by summing the values of $e^{(x_i - max(x))}$ across the element values of x. The computing system 102 instructs the SPU 110 to stores this scalar sum in the SRF 606 at the memory index identified by "spu_accum2." In operation (10), the computing system 102 instructs a scalar reciprocal HC 618 to generate the reciprocal of the sum generated in operation (9). It performs this task by pulling the sum from the SRF 606 at the location identified by "spu_accum2," computing the reciprocal, and storing the reciprocal in the SRF 606 at a memory location identified by "spu_recip." In operation (11), the computing system 102 instructs the broadcast HC 608 to generate an output vector by replicating the reciprocal value stored at "spu_recip."

In operation (12), the computing system 102 instructs a vector register file "Multiply_Vrf" 620 to store the reciprocal value, at a location identified by "denom." More specifically, the computing system 102 performs its operations by making at least two passes through the pipeline of operations associated with at least one multifunction unit. Assume that the computing system 102 accesses the Multiply_Vrf vector register file 620 in a second pass through pipeline. In operation (13), the computing system 102 reads the vector previously stored at "tmp2" in the Initial_Vrf vector register file 602. In operation (14), the computing system 102 instructs a Multiply HC 622 to multiply the vector stored at "tmp2" by the vector in the Multiply_Vrf vector register file 620 (identified by "denom"). In operation (15), the computing system 102 writes the output result generated in operation (14) to a specified destination location.

Example 2: Layer Normalization

In a second example, the computing system 102 performs operations to normalize the values in a layer of a neural network. It performs these operations by first computing the mean ($\mu$) and deviation ($\sigma$) of values in a vector x according the following equations:

$$\mu = \frac{1}{H}\sum_{i=1}^{H} x_i$$

$$\sigma = \sqrt{\frac{1}{H}\sum_{i=1}^{H} (x_i - \mu)^2 + \varepsilon}$$

The computing system 102 uses the mean and the deviation measures to normalize x based on some function of $$\frac{x - \mu}{\sigma} + b,$$

where b is a bias factor. Note that H refers to the number of elements in x.

The following explanation will set forth one non-limiting way that SPU 110 of FIG. 4 can perform the layer normalization operation, in conjunction the tensor-processing engine 108 of FIG. 2. The computing system 102 first uses the sum-reduce HC 410 to generate the sum $\Sigma_{i=1}^{H} x_i$. It then uses the broadcast HC 424 to generate an output vector that expresses the sum, replicated across its elements. The computing system 102 then uses a multiplier HC provided by a tensor-processing unit to multiply the reciprocal of H by the sum of element values in x, to yield the mean value $\mu$, replicated across a vector. (Assume that the reciprocal of H is pre-calculated and stored as a known parameter value, and is not calculated in real time.)

The computing system 102 can then use a subtraction HC of a tensor-processing unit to subtract the mean value p (expressed in vector form) from each value of x, to yield a plurality of difference values $(x_i-\mu)$. The computing system 102 then uses a multiplier HC of the tensor-processing unit to compute the square of $(x_i-\mu)$, e.g., by multiply two vectors together that express $(x_i-\mu)$. The computing system 102 then calls on the sum-reduce HC 410 to sum the individual values of $(x_i-\mu)^2$, and the broadcast HC 424 to replicate this sum across the dimensions of an output vector. The computing system 102 next uses a multiplier HC provided by a tensor-processing unit to multiply the reciprocal of H (which is a pre-calculated value) by the vector that expresses $\Sigma_{i=1}^{H}(x_i-\mu)^2$. The computing system 102 next calls on an addition HC in a tensor-processing unit to add the value to $\varepsilon$ to $$\frac{1}{H}\sum_{i=1}^{H} (x_i - \mu)^2,$$

which it again expresses in vector form.

The computing system 102 then writes the results of the above calculation to the SPU 110 via the max-reduce HC 412. This effectively converts the results of the above calculation from vector form to scalar form, which it stores in the SRF 404. The computing system 102 then calls on the scalar square root HC 422 to calculate the square root of the thus-generated scalar. This yields the deviation value $\sigma$. The computing system 102 then uses the scalar reciprocal HC 420 to compute the reciprocal of $\sigma$. It then uses the broadcast HC 424 to provide an output vector having the replicated value of $1/\sigma$.

Finally, the computing system 102 uses a multiplier HC of a tensor-processing unit to multiply $1/\sigma$ by $(x_i-\mu)$, to produce a vector product, and uses an addition HC of a tensor-processing unit to add the bias factor b to the vector product.

The above allocation of operations to the tensor-processing engine 108 and the SPU 110 is set forth in the spirit of illustration, not limitation. As will be appreciated, in some cases, a developer has some discretion in decided whether it is more efficient to perform an operation in tensor-based form by a tensor-processing unit or in scalar form by the SPU 110. For example, both the tensor-processing engine 108 and the SPU 110 can include a multiplier HC. The developer can decide whether it is more efficient to execute a multiplication operation in tensor form or scalar form. The developer can make this determination based on the flow associated with a particular DNN being implemented and/or other considerations.

B. Illustrative Process

FIG. 7 shows a process 702 that explains the operation of the computing system 102 of Section A in flowchart form. Since the principles underlying the operation of the computing system 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 704, in the course of executing a set of instructions that carry out operations associated with a neural network or other analysis task, the computing system 102 uses a tensor-processing engine 108 to convert at least one instance of input tensor information to at least one instance of output tensor information. In block 706, in the course of executing the set of instructions, the computing system 102 uses a scalar-processing unit 110 to: (706.1) provide one or more scalars based on an input vector received from the tensor-processing engine 108; (706.2) store the one or more scalars in a scalar register file 404; (706.3) retrieve at least one input scalar from the scalar register file 404; (706.4) perform a scalar-processing function to generate at least one output scalar based on the at least one input scalar; (706.5) store the at least one output scalar in the scalar register file 404; and (706.6) provide an output vector based on one or more scalars stored in the scalar register file 404. The method uses a same vector-based programmatic interface to interact with the tensor-processing engine 108 and the scalar-processing unit 110.

C. Representative Computing Hardware

Figure 8:
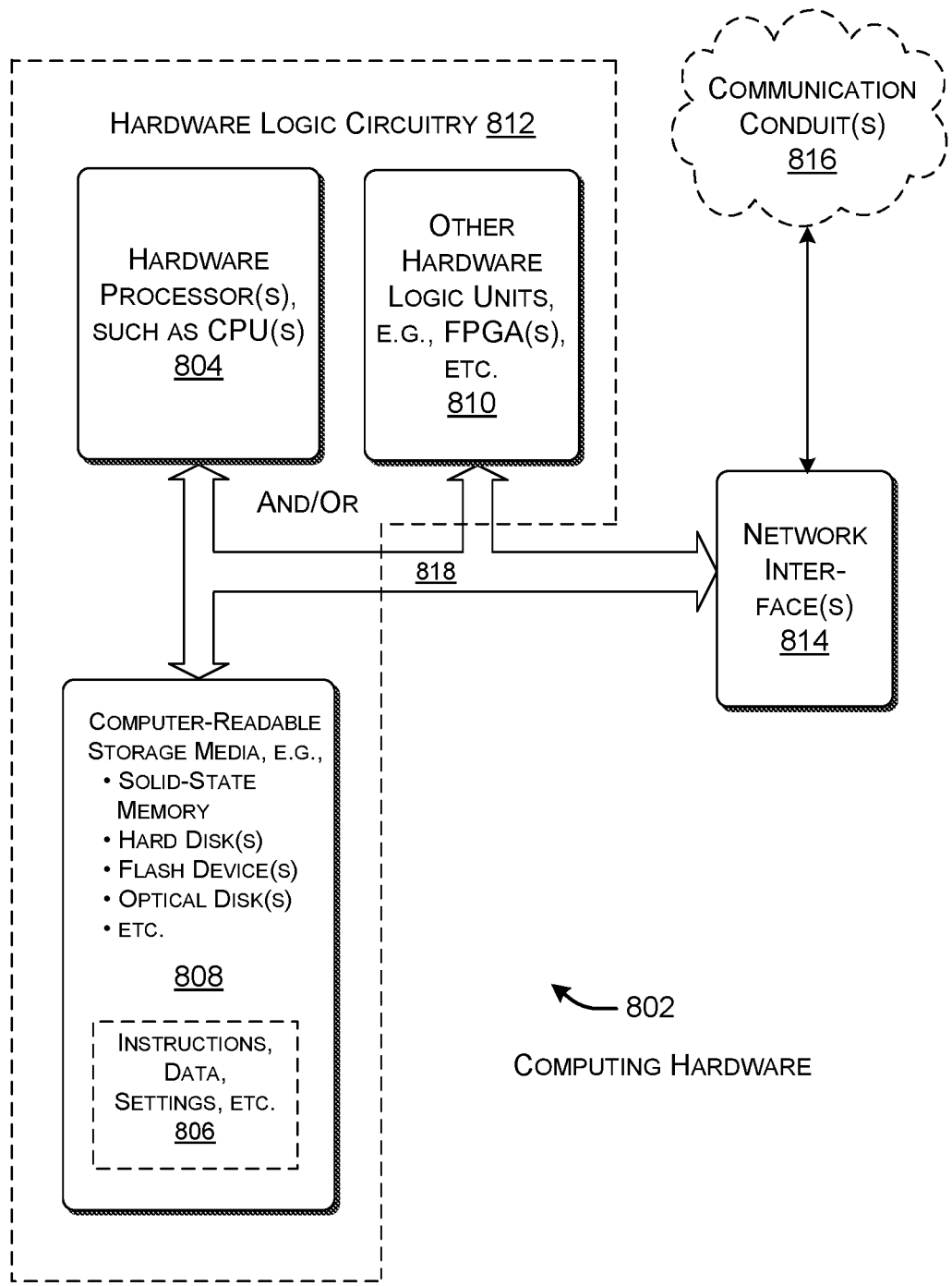
FIG. 8 shows illustrative computing hardware that can be used to implement any aspect of the features shown in the foregoing drawings.

FIG. 8 shows a computing hardware 802 that can be used to implement any aspects of the mechanisms set forth in the above-described figures. The computing hardware 802 can include one or more hardware processors 804 that execute instructions stored in a memory. For instance, the hardware processor(s) 804 can include one or more central processing units (CPUs). According to one implementation, the computing system 102 can use the hardware processor(s) 804 to implement at least the control logic 122 and the instruction decoder 126.

More generally, the hardware processor(s) 804 interact with any information 806 stored in computer-readable storage media 808. The information 806 can include instructions (e.g., the computer program 124), data, settings, etc. Any instance of the computer-readable storage media 808 can use any technology for storing and retrieving information. In one case, the computer-readable storage media 808 represents a hardware memory unit (such as Random Access Memory (RAM)) for storing transient information during execution of a program by the computing hardware 802. Alternatively, or in addition, the computer readable storage media 808 represents a hardware storage unit (such as a hard disk) for retaining/archiving information on a more permanent basis. Further, any instance of the computer-readable storage media 808 may represent a fixed or removable unit of the computing hardware 802.

The computing hardware 802 can rely one other hardware logic units 810 to implement at least some aspects of the hardware accelerator 104. In one case, the hardware logic unit(s) 810 may include a fixed configuration of hardware logic gates, e.g., that are created and set at the time of manufacture, and thereafter unalterable. Alternatively, or in addition, the other hardware logic unit(s) 810 may include a collection of programmable hardware logic gates that can be set to perform different application-specific tasks. The latter category of devices includes, but is not limited to Programmable Array Logic Devices (PALs), Complex Programmable Logic Devices (CPLDs), Field-Programmable Gate Arrays (FPGAs), etc.

FIG. 8 generally indicates that hardware logic circuitry 812 includes any combination of the hardware processor(s) 804, the computer-readable storage media 808, and/or the other hardware logic unit(s) 810. That is, the computing device 802 can employ any combination of the hardware processor(s) 804 that execute machine-readable instructions provided in the computer-readable storage media 808, and/ or one or more other hardware logic unit(s) 810 that perform operations using a fixed and/or programmable collection of hardware logic gates. More generally stated, the hardware logic circuitry 812 corresponds to one or more hardware logic units of any type(s) that perform operations based on logic stored in and/or otherwise embodied in the hardware logic unit(s)

The computing hardware 802 can also include one or more network interfaces 814 for exchanging data with other devices via one or more communication conduits 816. The communication conduit(s) 816 can be implemented in any manner, e.g., by a local area computer network provided by a data center, a wide area computer network (e.g., the Internet), point-to-point connections, etc., or any combination thereof. The communication conduit(s) 816 can include any combination of hardwired links, wireless links, routers, gateway functionality, name servers, etc., governed by any protocol or combination of protocols. Finally, one or more communication buses 818 communicatively couple the above-described units together FIG. 8 shows the computing hardware 802 as being composed of a discrete collection of separate units. In some cases, the collection of units may correspond to discrete hardware units provided in a computing device chassis having any form factor. In other cases, the computing hardware 802 can include a hardware logic unit that integrates the functions of two or more of the units shown in FIG. 1. For instance, the computing hardware 802 can include a system on a chip (SoC or SOC), corresponding to an integrated circuit that combines the functions of two or more of the units shown in FIG. 8.

In one environment, a data center provides one or more instances of the computing hardware 802 shown in FIG. 8, e.g., arranged in a hierarchical fashion. The network interface(s) 816 receive requests from external entities, and forward responses to these requests to the external entities.

The following summary provides a non-exhaustive set of illustrative aspects of the technology set forth herein.

According to a first aspect, a computing system is described for executing operations using a hardware accelerator. The hardware accelerator includes a tensor-processing engine and a scalar-processing unit. The tensor-processing engine includes: at least one tensor register file for storing tensors; and two or more tensor operation hardware components for performing respective tensor-processing functions based on tensors stored in the at least one tensor register file. The scalar-processing unit includes: a vector-to-scalar interface for providing one or more scalars based on an input vector received from the tensor-processing engine; a scalar register file for storing each scalar provided by the vector-to-scalar interface; one or more scalar operation hardware components for performing respective scalar-processing functions, each scalar operation hardware component retrieving at least one input scalar from the scalar register file, performing a scalar-processing function to generate at least one output scalar based on the at least one input scalar, and storing the at least one output scalar in the scalar register file; and a scalar-to-vector interface for providing an output vector based on one or more scalars stored in the scalar register file. The hardware accelerator also includes control logic for providing instructions that govern operation of the tensor-processing engine and the scalar-processing unit. The hardware accelerator uses a same vector-based programmatic interface to interact with the tensor-processing engine and the scalar-processing unit.

According to a second aspect, the instructions express operations associated with a deep neural network.

According to a third aspect, the tensor-processing engine includes plural channels that perform tensor-based operations in parallel.

According to a fourth aspect, the tensor-processing engine includes a processing pipeline that is made up of two or more tensor operation hardware components that operate in series.

According to a fifth aspect, the vector-to-scalar interface includes at least one hardware component that generates a sum of element values presented in the input vector.

According to a sixth aspect, the vector-to-scalar interface includes at least one hardware component that identifies a maximum or minimum scalar by selecting from among element values in the input vector.

According to a seventh aspect, the vector-to-scalar interface includes functionality for receiving the input vector at a same time, and for storing scalars associated with element values in the input vector.

According to an eighth aspect, the scalar-to-vector interface includes a broadcast hardware component for replicating a scalar stored in the scalar register file across elements of the output vector.

According to a ninth aspect, the scalar-to-vector interface includes a vector assembly component for assembling the output vector based on plural scalars stored in the scalar register file.

According to a tenth aspect, the hardware accelerator includes plural channels for performing operations in parallel. The scalar register file corresponds to a global resource for use by all of the channels, whereas the vector-to-scalar interface is duplicated for each channel of the hardware accelerator, and the scalar-to-vector interface is duplicated for each channel of the hardware accelerator.

According to an eleventh aspect, the hardware accelerator further includes a vector memory manager that provides an interface between the hardware accelerator and a memory, wherein the scalar-processing unit interacts with the tensor-processing engine via the vector memory manager.

According to a twelfth aspect, the instructions use a write command to provide the input vector to the scalar-processing unit.

According to a thirteenth aspect, the instructions use a read command to retrieve the output vector from the scalar-processing unit.

According to a fourteenth aspect, a method if described for executing operations using a hardware accelerator. The method includes, in a course of executing a set of instructions that carry out operations associated with a neural network or other analysis task, using a tensor-processing engine to convert at least one instance of input tensor information to at least one instance of output tensor information. The method also includes, in a course of executing the set of instructions, using a scalar-processing unit to: provide one or more scalars based on an input vector received from the tensor-processing engine; store the one or more scalars in a scalar register file; retrieve at least one input scalar from the scalar register file; perform a scalar-processing function to generate at least one output scalar based on the at least one input scalar; store the at least one output scalar in the scalar register file; and provide an output vector based on one or more scalars stored in the scalar register file. The method uses a same vector-based programmatic interface to interact with the tensor-processing engine and the scalar-processing unit.

According to a fifteenth aspect, relating to the fourteenth aspect, the scalar-processing unit provides the one or more scalars based on the received input vector by reducing the input vector to a single scalar.

According to a sixteenth aspect, relating to the fourteenth aspect, the scalar-processing unit provides the output vector by replicating a scalar stored in the scalar register file across elements of the output vector.

According to a seventeenth aspect, relating to the fourteenth aspect, the instructions use a write command to provide the input vector to the scalar-processing unit, and the instructions use a read command to retrieve the output vector from the scalar-processing unit.

According to an eighteenth aspect, a hardware accelerator is described that includes tensor-processing engine and a scalar-processing unit. The tensor-processing engine includes: at least one tensor register file for storing tensors; and two or more tensor operation hardware components for performing respective tensor-processing functions based on tensors stored in the at least one tensor register file. The scalar-processing unit includes: a vector-to-scalar interface for providing one or more scalars based on an input vector received from the tensor-processing engine; a scalar register file for storing each scalar provided by the vector-to-scalar interface; one or more scalar operation hardware components for performing respective scalar-processing functions, each scalar operation hardware component being configured to retrieve at least one input scalar from the scalar register file, perform a scalar-processing function to generate at least one output scalar based on the at least one input scalar, and store the at least one output scalar in the scalar register file; and a scalar-to-vector interface for providing an output vector based on one or more scalars stored in the scalar register file. The hardware accelerator uses a same vector-based programmatic interface to interact with the tensor-processing engine and the scalar-processing unit.

According to a nineteenth aspect, relating to the eighteenth aspect, the hardware accelerator further includes a vector memory manager that provides an interface between the hardware accelerator and a memory, wherein the scalar-processing unit interacts with the tensor-processing engine via the vector memory manager.

According to a twentieth aspect, relating to the eighteenth aspect, the hardware accelerator includes plural channels for performing operations in parallel. The scalar register file corresponds to a global resource for use by all of the channels, whereas the vector-to-scalar interface is duplicated for each channel of the hardware accelerator, and the scalar-to-vector interface is duplicated for each channel of the hardware accelerator.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system for executing operations, comprising:
 a hardware accelerator that implements a vector-based data flow, and that includes a tensor-processing engine and a scalar-processing unit, the tensor-processing engine including:
  at least one tensor register file for storing tensors; and
  two or more tensor operation hardware components for performing respective tensor-processing functions based on tensors stored in said at least one tensor register file;
the scalar-processing unit configured to operate as a native element in the vector-based data flow and including:
  a vector-to-scalar interface for providing one or more scalars based on an input vector received from the tensor-processing engine;
  a scalar register file for storing each scalar provided by the vector-to-scalar interface;
  one or more scalar operation hardware components for performing respective scalar-processing functions,
  each scalar operation hardware component retrieving at least one input scalar from the scalar register file, performing a scalar-processing function to generate at least one output scalar based on said at least one input scalar, and storing said at least one output scalar in the scalar register file; and
  a scalar-to-vector interface for providing an output vector based on one or more scalars stored in the scalar register file; and
control logic for providing a program that governs operation of the tensor-processing engine and the scalar-processing unit, the computing system invoking the scalar-processing unit to carry out at least one scalar operation specified by the program, within the vector-based data flow,
the hardware accelerator using a same kind of vector-based programmatic interface instructions to interact with the tensor-processing engine and the scalar-processing unit, the vector-based programmatic interface instructions including vector write commands to provide input vectors to both the tensor-processing engine and the scalar-processing unit, and including vector read commands to retrieve output vectors from both the tensor-processing engine and the scalar-processing unit,
the hardware accelerator and the control logic being implemented using hardware logic circuitry, the hardware logic circuitry, in turn, including one or more hardware processors in conjunction with memory, and/or one or more other hardware logic units that perform operations using a fixed and/or programmable collection of hardware logic gates.

2. The computing system of claim 1, wherein the program expresses operations associated with a deep neural network.

3. The computing system of claim 1, wherein the tensor-processing engine includes plural channels that perform tensor-based operations in parallel.

4. The computing system of claim 1, wherein the tensor-processing engine includes a processing pipeline that is made up of two or more tensor operation hardware components that operate in series.

5. The computing system of claim 1, wherein the vector-to-scalar interface includes at least one hardware component that generates a sum of element values presented in the input vector.

6. The computing system of claim 1, wherein the vector-to-scalar interface includes at least one hardware component that identifies a maximum or minimum scalar by selecting from among element values in the input vector.

7. The computing system of claim 1, wherein the vector-to-scalar interface includes functionality for receiving the input vector at a same time, and for storing scalars associated with element values in the input vector.

8. The computing system of claim 1, wherein the scalar-to-vector interface includes a broadcast hardware component for replicating a scalar stored in the scalar register file across elements of the output vector.

9. The computing system of claim 1, wherein the scalar-to-vector interface includes a vector assembly component for assembling the output vector based on plural scalars stored in the scalar register file.

10. The computing system of claim 1,
  wherein the hardware accelerator includes plural channels for performing operations in parallel, and
  wherein the scalar register file corresponds to a global resource for use by all of the channels, whereas the vector-to-scalar interface is duplicated for each channel of the hardware accelerator, and the scalar-to-vector interface is duplicated for each channel of the hardware accelerator.

11. The computing system of claim 1, wherein the hardware accelerator further includes a vector memory manager that provides an interface between the hardware accelerator and a memory, wherein the scalar-processing unit interacts with the tensor-processing engine via the vector memory manager.

12. The computing system of claim 1,
  wherein the vector-to-scalar interface has plural selectable vector-to-scalar interface components, an operand in a particular vector write instruction selecting a particular vector-to-scalar interface component to be used to provide said one or more scalars based on the input vector, and
  wherein the scalar-to-vector interface has plural selectable scalar-to-vector interface components, an operand in a particular vector read instruction selecting a particular scalar-to-vector interface component to be used to provide the output vector.

13. A method for executing operations using a hardware accelerator, comprising:
  in a course of executing a set of instructions in a program that carry out operations associated with a neural network or other analysis task, and which implement a vector-based data flow, using a tensor-processing engine to convert at least one instance of input tensor information to at least one instance of output tensor information; and
  in a course of executing the set of instructions, using a scalar-processing unit to:
    provide one or more scalars based on an input vector received from the tensor-processing engine;
    store said one or more scalars in a scalar register file;
    retrieve at least one input scalar from the scalar register file;
    perform a scalar-processing function to generate at least one output scalar based on said at least one input scalar, the scalar-processing function being performed to carry out a scalar operation specified by the program, within the vector-based data flow;
    store said at least one output scalar in the scalar register file; and
    provide an output vector based on one or more scalars stored in the scalar register file,
  the scalar-processing unit being configured to operate as a native element in the vector-based data flow,
  the method using a same kind of vector-based programmatic interface instructions to interact with the tensor-processing engine and the scalar-processing unit, the vector-based programmatic interface instructions including vector write commands to provide input vectors to both the tensor-processing engine and the scalar-processing unit, and vector read commands to retrieve output vectors from both the tensor-processing engine and the scalar-processing unit, the hardware accelerator being implemented using hardware logic circuitry, the hardware logic circuitry, in turn, including one or more hardware processors in conjunction with memory, and/or one or more other hardware logic units that perform operations using a fixed and/or programmable collection of hardware logic gates.

14. The method of claim 13, wherein the scalar-processing unit provides said one or more scalars based on the received input vector by reducing the input vector to a single scalar.

15. The method of claim 13, wherein the scalar-processing unit provides the output vector by replicating a scalar stored in the scalar register file across elements of the output vector.

16. The method of claim 13,
wherein the scalar-processing unit has a vector-to-scalar interface that has plural selectable vector-to-scalar interface components, an operand in a particular vector write instruction selecting a particular vector-to-scalar interface component to be used to provide said one or more scalars based on the input vector, and
wherein the scalar-processing unit has a scalar-to-vector interface that has plural selectable scalar-to-vector interface components, an operand in a particular vector read instruction selecting a particular scalar-to-vector interface component to be used to provide the output vector.

17. A hardware accelerator that implements a vector-based data flow, comprising:
a tensor-processing engine including:
at least one tensor register file for storing tensors; and
two or more tensor operation hardware components for performing respective tensor-processing functions based on tensors stored in said at least one tensor register file; and
a scalar-processing unit configured to operate as a native element in the vector-based data flow and including:
a vector-to-scalar interface for providing one or more scalars based on an input vector received from the tensor-processing engine in response to a particular vector write command;
a scalar register file for storing each scalar provided by the vector-to-scalar interface;
one or more scalar operation hardware components for performing respective scalar-processing functions,
each scalar operation hardware component being configured to retrieve at least one input scalar from the scalar register file, perform a scalar-processing function to generate at least one output scalar based on said at least one input scalar, and store said at least one output scalar in the scalar register file, the scalar-processing function being performed to carry out a scalar operation specified in an instruction processed by the hardware accelerator, within the vector-based data flow; and
a scalar-to-vector interface for providing an output vector based on one or more scalars stored in the scalar register file in response to a particular vector read command,
the hardware accelerator using a same kind of vector-based programmatic interface instructions to interact with the tensor-processing engine and the scalar-processing unit, the vector-based programmatic interface instructions including vector write commands to provide input vectors to both the tensor-processing engine and the scalar-processing unit, and including vector read commands to retrieve output vectors from both the tensor-processing engine and the scalar-processing unit,
the hardware accelerator being implemented using hardware logic circuitry, the hardware logic circuitry, in turn, including one or more hardware processors in conjunction with memory, and/or one or more other hardware logic units that perform operations using a fixed and/or programmable collection of hardware logic gates.

18. The hardware accelerator of claim 17, further including a vector memory manager that provides an interface between the hardware accelerator and a memory, wherein the scalar-processing unit interacts with the tensor-processing engine via the vector memory manager.

19. The hardware accelerator of claim 17,
wherein the hardware accelerator includes plural channels for performing operations in parallel, and
wherein the scalar register file corresponds to a global resource for use by all of the channels, whereas the vector-to-scalar interface is duplicated for each channel of the hardware accelerator, and the scalar-to-vector interface is duplicated for each channel of the hardware accelerator.

20. The hardware accelerator of claim 17,
wherein the vector-to-scalar interface has plural selectable vector-to-scalar interface components, an operand in the particular vector write instruction selecting a particular vector-to-scalar interface component to be used to provide said one or more scalars based on the input vector, and
wherein the scalar-to-vector interface has plural selectable scalar-to-vector interface components, an operand in the particular vector read instruction selecting a particular scalar-to-vector interface component to be used to provide the output vector.

* * * * *